(12) United States Patent
Schwindt et al.

(10) Patent No.: US 6,723,787 B2
(45) Date of Patent: Apr. 20, 2004

(54) SOLVENT-FREE, TWO-COMPONENT, POLYURETHANE REACTIVE COMPOSITIONS AND COATINGS PRODUCED THEREFROM THAT HAVE GOOD ELONGATION AND WITHSTAND CATHODIC PROTECTION

(75) Inventors: Jürgen Schwindt, Leverkusen (DE); Malte Homann, Odenthal (DE); Karl-Heinz Kolping, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/308,663

(22) Filed: Dec. 3, 2002

(65) Prior Publication Data

US 2003/0139561 A1 Jul. 24, 2003

(30) Foreign Application Priority Data

Dec. 4, 2001 (DE) .......................... 101 59 374

(51) Int. Cl.$^7$ .............................. C08G 18/48
(52) U.S. Cl. ................ 524/755; 524/796; 525/131
(58) Field of Search ................ 524/755, 796; 525/131

(56) References Cited

FOREIGN PATENT DOCUMENTS

EP        0 376 674        7/1990

WO        01/79369        10/2001

OTHER PUBLICATIONS

Database WPI, Week 9904, Derwent Publications Ltd., London, GB; AN 1999–040914 XP002234334 & JP 10 298456 A (JIN), Nov. 10, 1998 Zusammenfassung.

Database WPI, Week 8736, Derwent Publications Ltd., London, GB; AN 1987–253379, XP002234335 & JP 62 174220 A (Taoka Chem), Jul. 31, 1987 Zusammenfassung.

Primary Examiner—Rachel Gorr
(74) Attorney, Agent, or Firm—Joseph C. Gil; Gary F. Matz; Thomas W. Roy

(57) ABSTRACT

The present invention relates to a solvent-free, two component polyurethane coating composition that is suitable for the production of coatings that have long term resistance to temperatures of up to 30° C., have good elongation and withstand cathodic protection, which contains A) a solvent-free polymer mixture containing a component free from OH groups containing at least one of a chlorinated paraffin or dibutoxybenzene, a di-(phenoxy-alkyl) formal, or a polyacrylonitrile, and a component having hydroxyl groups including a component which contains hydroxy groups and ether groups, and optionally a hydroxy-functional polyether polyacrylate and/or another hydroxy-functional compound; and B) a polyisocyanate component containing at least one organic polyisocyanate, where the NCO:OH equivalent ratio is 0.8:1 to 1.5:1.

14 Claims, No Drawings

SOLVENT-FREE, TWO-COMPONENT, POLYURETHANE REACTIVE COMPOSITIONS AND COATINGS PRODUCED THEREFROM THAT HAVE GOOD ELONGATION AND WITHSTAND CATHODIC PROTECTION

FIELD OF THE INVENTION

The present invention relates to solvent-free, two-component, polyurethane reactive compositions (2C-PUR) modified with special soft resins, for the production hydrophobic coatings that have good elongation, withstand cathodic protection and have long term temperature resistance.

BACKGROUND OF THE INVENTION

To protect oil and gas pipelines, and also the ballast tanks of ships, from corrosion, coatings are required that are highly hydrophobic, are impact-resistant, have good elongation and withstand cathodic protection. Fusion bonded epoxide (FBE) systems, applied as a primer (optionally 2 coats) are known for coating pipelines. Here the powder is reacted on the hot pipe. The FBE coating is coated with polyethylene/polypropylene (PE/PP) by the sintering process, or a coating is built up with adhesive, PU foam and polyethylene. PUR systems applied as wet coatings both to the cold pipe or the field joints also known in the prior art. The pre-coated pipes are bent on site before incorporation into the pipeline network.

A disadvantage of the prior art is that the FBE coatings are brittle and do not have either stone impact resistance or elongation. The bending stresses arising when laying pipelines lead to the formation of cracks in the coating and thus the loss of corrosion protection. FBE systems can be applied for repairs on site or to coat field joints only at great cost (higher energy requirement) and with low productivity. EP-Wet systems cannot be used on site below 0° C. The disadvantages of the pure some cases have lower tolerance of cathodic protection. The hydrophilic properties of the 2C-PUR systems require layer thicknesses of >1000 μm for corrosion protection of pipes and ballast tanks.

An object of the present invention is to provide solvent-free, liquid primers for the corrosion protection of pipes, which
a) have a long term temperature resistance of up to 30° C. and at the same time withstand cathodic protection,
b) have an elongation at break of at least >5% and are impact resistant,
c) provide long term protection even in thinner coats of 600–900 pm because they are more hydrophobic,
d) can be applied both on site and in a workshop, and cure at temperatures below 0° C.,
e) can be used both for the pipe and for the field joints and
f) have a longer pot life (up to 15 minutes) and a longer surface-working time (up to 50 minutes).

These objects may be achieved with the polyurethane reactive compositions of the present invention as described hereinafter.

SUMMARY OF THE INVENTION

The present invention relates to a solvent-free, two-component polyurethane coating composition that is suitable for the production of coatings that have long term resistance to temperatures of to 30° C., have good elongation and withstand cathodic protection, which contains A) a solvent-free polymer mixture containing
  I) 5 to 50 wt. % of a component free from OH groups and containing
    a) 0 to 100 wt. % of a chlorinated paraffin or dibutoxybenzene,
    b) 0 to 100 wt. % of a di-[phenoxy-alkyl]formal,
    c) 0 to 100 wt. % of a polyacrylonitrile,
  wherein the percentages of I-a), I-b) and I-c) add up to 100 wt. %, based on the weights of I-a) to I-c), and
  II) 50 to 95 wt. % of a component having hydroxyl groups comprising
    a) 40 to 100 wt. % of a component which contains hydroxy groups and ether groups, has a functionality of >3.5 and a number average molecular weight of 280 to 1000, and is different from b),
    b) 0 to 60 wt. % of a hydroxy-functional polyether polyacrylate and
    c) 0 to 60 wt. % of a hydroxy-functional compound other than a) and b),
  wherein the wt. % of 11-a) to 11-c) add up to 100 wt. %, based on the weight of component 11) and
B) a polyisocyanate component comprising at least one organic polyisocyanate, wherein the NCO:OH equivalent ratio is 0.8:1 to 1.5:1.

DETAILED DESCRIPTION OF THE INVENTION

In accordance with the present invention component 1) of solvent-free polymer mixture A) preferably contains
d) a mixture of a) and b) wherein the weight ratio of a):b) is 99:1 to 1:99,
e) a mixture of a) and c) wherein the weight ratio of a):c) is 99:1 to 1:99
or
f) a mixture of b) and c) wherein the weight ratio of b):c) is 99:1 to 1:99.

Suitable OH group-free components I-a) include chlorinated paraffins such as Hordaflex®, Types LC and SP, (Hoechst), Cerechlor®, Types 70/42 (ICI), Rishichlor® (Rishiroop), or polychlorodibutoxybenzene (Rishiroop).

Suitable components I-b) include di(phenoxy-ethyl) formal such as Desavin® (Bayer).

Suitable components I-c) include polyacrylonitriles having a average molecular weight of 600 to 3000.

Suitable components II-a), which contain hydroxyl groups, are polyether polyols, which can be obtained by known in known manner by the addition of cyclic ethers (such as ethylene oxide, propylene oxide, styrene oxide, butylene oxide or tetrahydrofuran) to starter molecules (such as polyvalent alcohols, aminoalcohols or amines free from ether groups, which have a number average molecular weight of 280 to 1000, preferably 350 to 700 and more preferably 400 to 500. The functionality of the starter molecules, with regard to the reaction with cyclic ethers, must be ≧3.5, preferably ≧4. Polyethers, which contain at least 50%, preferably at least 90%, based on the weight of the repeating units, of —CH(CH₃)CH₂O group, are especially preferred.

Polyvalent alcohols suitable for use as starter molecules include glycerine, trimethylolpropane, butanetriol-(1,2,4), hexanetriol-(1,2,6), bis(trimethylolpropane), pentaerythritol, mannitol or methylglycoside.

Suitable aminoalcohols include 2-aminoethanol, diethanolamine, 3-amino-1-propanol, 1-amino-2-propanol, diisopropanolamine, 2-amino-2-hydroxymethyl-1,3-propanediol and mixtures thereof.

Suitable polyvalent amines include aliphatic or cycloaliphatic amines, such as ethylene diamine, 1,2-diaminopropane, 1,3-diamino-propane, 1,4-diaminobutane, 1,3-diamino-2,2-dimethylpropane, 4,4'-diaminodicyclohexyl-methane, isophorone diamine, hexamethylene diamine, and 1,12-dodecane diamine; aromatic amines such as the isomers of toluylene diamine; and mixtures thereof.

Polyhydroxy component II-b), which is optionally present in the binder mixture according to the invention, can be produced e.g. according to EP-A 825210 (U.S. Pat. No. 6,130,285, herein incorporated by reference).

Suitable alcohol components 11-c) have a (number average) molecular weight of 32 to 1000, preferably 32 to 350. Examples include methanol, ethanol, propanol, butanol, hexanol, 2-ethylhexanol, cyclohexanol, stearyl alcohol, ethylene glycol, diethylene glycol, triethylene glycol, propanediol-1,2 and -1,3, dipropylene glycol, tripropylene glycol, butanediol-1,2, -1,3 -1,4 and -2,3, pentanediol-1,5,3-methylpentanediol-1,5, hexanediol-1,6,2-ethylhexanediol-1,3,2-methylpropenediol-1,3, 2,2-dimethylpropanediol-1,3,2-butyl-2-ethylpropanediol-1,3,2, 2,4-trimethylpentanediol-1,3, octanediol-1,8, higher molecular weight α-alkanediols containing 9 to 18 carbon atoms, cyclohexanedimethanol, cyclohexanediol, glycerine, trimethylolpropane, butanetriol-1,2,4, hexanetriol-1,2,6, bis(trimethylolpropane), pentaerythritol, mannitol and methylglycoside are preferred.

The hydroxy polyesters, hydroxy polyester amides, hydroxy polyethers having a functionality of <3.5, polythioether polyols, hydroxy polycarbonates and hydroxy polyacetals having a number average molecular weight of up to 1,000, which are known from polyurethane chemistry, can optionally also be used as component II-c).

Known stabilizers from coatings technology, such as antioxidants and light stabilizers, can optionally be added to polymer mixture A) to further improve the light- and weather stability of the polyether polyacrylates. The binder mixtures according to the invention are preferably used without stabilizers.

Suitable antioxidants include stearically-hindered phenols such as 4-methyl-2,6-di-tert.-butylphenol (BHT) or other substituted phenols, thioethers (e.g. Irganox PS®, Ciba Geigy) or phospites (e.g. Irgaphos®, Ciba Geigy) available from Ciba Geigy under the product class name Irganox®. Suitable light stabilizers include HALS (Hindered Amine Light Stabilizers) such as Tinuvin® 622 D or Tinuvin® 765 (Ciba Geigy); and substituted benzotriazoles, such as Tinuvin® 234, Tinuvin® 327 and Tinuvin® 571 (Ciba Geigy).

Polyhydroxy component 11 contains 40 to 100 wt. % of component II-a), 0 to 60 wt. % of component II-b) and 0 to 60 wt. % of component II-c). The sum of components II-a) to II-c), without taking account of any antioxidants or light stabilizers, is 100 wt. %.

Polyisocyanate component B) according to the invention is an organic polyisocyanate having an average NCO functionality of at least 2 and a molecular weight of at least 140. Suitable polyisocyanates include (i) unmodified organic polyisocyanates having with a molecular weight of 140 to 300, (ii) lacquer polyisocyanates having a number average molecular weight of 300 to 1,000, also (iii) urethane group-containing NCO pre polymers having a number average molecular weight of >1,000, and mixtures thereof.

Examples of polyisocyanates i) include 1,4-diisocyanatobutane, 1,6-diisocyanatohexane (HDI), 1,5-diisocyanato-2,2-dimethylpentane, 2,2,4- or 2,4,4-trimethyl-1,6-d iisocyanatohexane, 1-isocyanato-3,3,5-trimethyl-5-isocyanatomethyl-cyclohexane (IPDI), 1-isocyanato-1-methyl-4-(3)-isocyanatomethyl-cyclohexane, bis-(4-isocyanatocyclohexyl)methane, 1,10-diisocyanatodecane, 1,12-diisocyanatodecane, cyclohexane-1,3- and 1,4-diisocyanate, xylylene diisocyanate isomers, 2,4- and 2,6-diisocyanatotoluene or mixtures thereof preferably containing, based on the mixture, up to 35 wt. % 2,6-diisocyanatotoluene, 2,2'-, 2,4'-, 4,4'-diisocyanatodiphenylmethane or polyisocyanate mixtures of the diphenylmethane series and mixtures of the preceding isocyanates. The polyisocyanates of the diphenylmethane series, in particular as isomer mixtures, are preferred.

Suitable polyisocyanates ii) include the known solvent-free lacquer polyisocyanates. Within the context of the invention, the term "lacquer polyisocyanates" is understood to mean compounds or mixtures of compounds, which are obtained, by oligomerizing diisocyanates 1) in known manner.

Suitable oligomerization reactions include allophanatization, biuretization, carbodiimidization, cyclization, dimerization, urea formation, trimerization and/or urethanization. "Oligomerization" often refers to several of the stated reactions taking place concurrently or consecutively. "Lacquer polyisocyanates" are preferably polyisocyanates containing uretdione, isocyanurate, allophanate, biuret, iminooxadiazinedione and/or oxadiazinetrione groups.

The production of lacquer polyisocyanates is known and disclosed, for example, in DE-A 1 595 273, DE-A 3 700 209, DE-A 3 900 053, EP-A-0 330 966, EPAO 259 233, EP-A-0 377 177, EP-A-0 496 208, EP-A-0 524 501 and U.S. Pat. No. 4,385,171.

The urethane group-containing lacquer polyisocyanates ii) can be obtained by the reaction of low molecular weight polyhydroxyl compounds with excess quantities of the preceding di- or polyisocyanates by using a large excess of the di- and polyisocyanates and subsequently removing the excess polyisocyanate, e.g. by thin layer distillation. The prepolymers are preferably produced at 40 to 140° C., optionally using suitable catalysts.

Suitable polyhydroxyl compounds for preparing the prepolymers are those having a molecular weight of 62 to 299, such as ethylene glycol, propylene glycol-1,3, butanediol-1,4, hexanediol-1,6, neopentylglycol, 2-ethylhexanediol-1,3, glycerine, trimethylolpropane, pentaerythritol, low-molecular weight esters of these polyols with dicarboxylic acids (such as those disclosed hereinafter), low molecular weight ethoxylation or alkoxylation products of these polyols and mixtures thereof.

Polyisocyanates iii) are the known prepolymers having isocyanate groups and prepared by reacting diisocyanates i) and/or lacquer polyisocyanates ii) with organic polyhydroxyl compounds having a number average molecular weight greater than or equal to 300. These polyhydroxyl compounds are known and preferably have a number average molecular weight of 300 to 20,000, more preferably 1,000 to 8,000.

Suitable high molecular weight polyhydroxyl compounds for the production of the prepolymers include polyester polyols prepared from the low molecular weight alcohols previously described and polybasic carboxylic acids such as adipic acid, sebacic acid, phthalic acid, isophthalic acid, tetrahydrophthalic acid, hexahydrophthalic acid, maleic acid, the anhydrides of these acids and any mixtures thereof. Polylactones having hydroxyl groups, in particular polycaprolactones, are also suitable for the production of the prepolymers.

Polyether polyols, such as those obtained in the known manner by the alkoxylation of suitable starter molecules, are also suitable for the production of the NCO prepolymers. Suitable starter molecules are the low molecular weight polyols previously described, water, organic polyamines with at least two N—H bonds and mixtures there. Alkylene oxides suitable for the alkoxylation reaction are preferably ethylene oxide and/or propylene oxide, which can be used in any order or in admixture in the alkoxylation reaction.

Polytetramethylene glycol polyethers, such as those obtained in known manner by cationic polymerization of tetrahydrofuran, are also suitable for the production of the prepolymers.

Polycarbonates having hydroxyl groups, such as those prepared, for example, by the reaction of low molecular diols with phosgene or diaryl carbonates such as diphenylcarbonate, are also suitable for the production of the prepolymers.

Polythioetherpolyols, such as those obtained, for example, by the polycondensation of the thiodiglycol with itself, or with diols and/or polyols, are also suitable for the production of prepolymers having NCO groups.

Polyacetals, such as polycondensation products of formaldehyde and diols or polyols that can be obtained using acid catalysts (e.g., phosphoric acid or p-toluenesulfonic acid), are also suitable for the production of prepolymers having NCO groups.

Mixtures of the preceding polyhydroxyl compounds can also be used to produce the prepolymers.

To produce the coating compositions according to the invention, components A) and B) are mixed with each other in amounts sufficient to provide an NCO:OH equivalent ratio of 0.8:1 to 1.5:1, preferably 0.9:1 to 1.3:1.

Known additives from coatings technology may optionally be added. Examples include levelling agents, viscosity-controlling additives, pigments, fillers, matting agents, UV stabilizers, antioxidants and catalysts for the crosslinking reaction. These compounds are normally added to and mixed with component A) before components A) and B) are mixed together.

The solvent-free, long term temperature resistant, two-component polyurethane coatings according to the invention can be used to protect any metal substrate, even under cathodic protection conditions at long term temperature loads of up to 30° C. The metallic substrates are preferably sheet pilings, locks, ships, pipes and other metal objects in the marine, offshore and onshore industries.

The invention is further illustrated but is not intended to be limited by the following examples in which all parts and percentages are by weight unless otherwise specified.

EXAMPLES

The coating materials were milled in the mixture having OH groups using a vacuum dissolver. The solvent-free coating compositions were applied with a 2C airless spray machine in layer thicknesses of 500 to 1200 μm, to 3 mm thick, SA 2½ blasted steel sheets. After storage for one week under laboratory conditions, the coatings were tested for tolerance of cathodic protection and also elongation and impact resistance. The pot life and surface-working time (repair, field joints) of the coatings were also determined.

Cathodic Protection Test to ASTMG8

| | |
|---|---|
| Medium: | 5% NaCl solution |
| Temperature: | 30° C. |
| Voltage: | $U_H = -1260$ mV |
| Duration: | 28 days |
| Judgement criteria: | Film decomposition on surface |
| | Constancy of current consumption |
| | Infiltration up to 10 mm in artificially damaged area |
| Impact resistance: | ASTM D 2794-93 |
| Shore D hardness: | DIN 53505 |
| Elongation at break of free films: | DIN EN ISO 527 |
| Pot life | (min or sec) |
| Surface-working | (min) |

Examples 1 to 5

Zero Values

TABLE I

| | | Ex. 1 (Parts) | Ex. 2 (Parts) | Ex. 3 (Parts) | Ex. 4 (Parts) | Ex. 5 (Parts) |
|---|---|---|---|---|---|---|
| Comp. 1 | | | | | | |
| Desmophen ® LS 2358 | (Bayer) | 22.7 | 12.75 | 73.84 | 45.4 | 22.7 |
| Desmophen ® VP LS 2285 | (Bayer) | — | 12.75 | — | 45.4 | — |
| 1,4-butanediol | (Bayer) | — | — | 14.4 | 6.92 | — |
| Baylith ® L-Paste | (Talke) | 5.4 | 5.4 | 21.6 | 21.6 | 5.4 |
| Anti-Terra 204 ® | (Byk Chemie) | 0.4 | 0.4 | 1.6 | 1.6 | 0.0 |
| Hardener DT | (Bayer) | 0.4 | 0.4 | 1.6 | 1.6 | 0.4 |
| Crayvallac ® Super | (Langer & Co) | 0.4 | 0.4 | 1.6 | 1.6 | 0.4 |
| Talc BC-Standard ® | (Naintsch Mineralwerke) | — | — | 22.4 | 22.4 | — |
| Naintsch ® BC Standard | (Naintsch Mineralwerke) | 5.6 | 5.6 | — | — | 5.6 |
| Plastorit ® Naintsch 0 | (Naitsch Mineralwerke) | 7.7 | 7.7 | 30.8 | 30.8 | 7.7 |
| Schwerspat EWO ® | (Sachtleben) | 18.9 | 18.9 | 75.6 | 75.6 | 18.9 |
| Bayertitan ® R-KB-4 | (Bayer) | 3.7 | 3.7 | — | — | 3.7 |

TABLE I-continued

|  |  | Ex. 1 (Parts) | Ex. 2 (Parts) | Ex. 3 (Parts) | Ex. 4 (Parts) | Ex. 5 (Parts) |
| --- | --- | --- | --- | --- | --- | --- |
| Tronox ® R-KB-4 | (Kerr Mc Gee) | — | — | 14.8 | 14.8 | — |
| Comp. 2 |  |  |  |  |  |  |
| Desmodur ® VL | (Bayer) | 32.05 | 27.5 | 128.2 | 128.2 | 31.5 |
| Desmodur ® E 14 | (Bayer) | — | — | — | — | 5.0 |
| CD Test (30° C.) |  |  |  |  |  |  |
| Layer thickness (μm) |  | 1050 | 840 | 730 | 780 | 1120 |
| Duration Evaluation |  | 29 d | 29 d | 28 d | 28 d | 29 d |
| Current consumption (start) | [mA] | 12.6 | 14.5 | 25 | 32 | 12 |
| Current consumption after 20 d | [mA] | 22.5 | 17 | 18.5 | 33.5 | 23 |
| Current consumption [end] | [mA] | 22 | 19 | 15 | 37.5 | 23 |
| Appearance of film (surface decomposition) |  | none | none | none | none | none |
| Infiltration in artificially damaged area [ASTMG 42–85] [mm] |  | 0-1 | 0-1 | 0 | 0 | 2 |
| Impact resistance [J/mm] |  | 7.5 | 7.8 | 8.2 | 8.2 | 8.5 |
| Shore D hardness |  | 82 | 80 | 80 | 81 | 77 |
| Elongation at break [%] |  | 2.0 | 2.0 | 2.3 | 2.3 | 17 |
| Pot life [sec] |  | 120 | 120 | 90 | 90 | 130 |
| Workability [min] |  | 0 | 0 | 0 | 0 | 0 |

EXAMPLES

According to the Invention

The following examples according to the invention (Tables II to VII) are based on the formulations of the 0 values in Table I. PVK and the NCO/OH ratio remain constant. The Desmophenes LS 2358 and/or LS 2285 and/or butanediol 1.4 are exchanged proportionately for the soft resins according to the invention or combinations thereof.

TABLE II

Examples 1–5 (according to the invention) according to 0 value of Example 1, Table I

|  |  | Ex. 1 (Parts) | Ex. 2 (Parts) | Ex. 3 (Parts) | Ex. 4 (Parts) | Ex. 5 (Parts) |
| --- | --- | --- | --- | --- | --- | --- |
| Comp. 1 |  |  |  |  |  |  |
| Desmophen ® LS 2358 | (Bayer) | 13.6 | 17.0 | 15.3 | 13.6 | 13.6 |
| Hordaflex SP | (Hoechst) | 9.1 |  | 3.7 | 9.1 |  |
| Desavin ® | (Bayer) | — | 5.7 | 3.7 | — | 9.1 |
| Baylith ® L- Paste | (Talke) | 5.4 | 5.4 | 5.4 | 5.4 | 5.4 |
| Anti-Terra 204 ® | (Byk Chemie) | 0.4 | 0.4 | 0.4 | 0.4 | 0.4 |
| Hardener DT ® | (Bayer AG) | 0.4 | 0.4 | 0.4 | 0.4 | 0.4 |
| Crayvallac ® Super | (Langer & Co) | 0.4 | 0.4 | 0.4 | 0.4 | 0.4 |
| Talc BC- Standard ® | (Naintsch Mineralwerke) | — | — | — | — | — |

TABLE II-continued

Examples 1–5 (according to the invention) according to 0 value of Example 1, Table I

|  |  | Ex. 1 (Parts) | Ex. 2 (Parts) | Ex. 3 (Parts) | Ex. 4 (Parts) | Ex. 5 (Parts) |
|---|---|---|---|---|---|---|
| Comp. 1 | | | | | | |
| Naintsch ® BC Standard | (Naintsch Mineralwerke) | 4.3 | 4.8 | 4.5 | 4.3 | 4.7 |
| Plastorit ® Naintsch 0 | (Naintsch Mineralwerke) | 5.9 | 6.6 | 6.3 | 5.9 | 6.4 |
| Schwerspat EWO ® | (Sachtleben) | 14.6 | 16.2 | 15.4 | 14.6 | 15.8 |
| Bayertitan ® R-KB-4 | (Bayer) | 2.9 | 3.2 | 3.0 | 2.9 | 3.1 |
| Tronox ® R-KB-4 | (Kerr Mc Gee) | — | — | — | — | — |
| Comp. 2 | | | | | | |
| Desmodur ® VL | (Bayer) | 19.5 | 24 | 21.6 | 19.5 | 18.6 |
| Desmodur ® E 14 | (Bayer) | — | — | — | — | 3.0 |
| CD Test (30° C.) ASTMG 42–85 | | | | | | |
| Layer thickness (µm) | | 850 | 810 | 790 | 600 | 820 |
| Duration (d) | | 28 | 28 | 28 | 28 | 28 |
| Current consumption (start) | [mA] | 18 | 19.5 | 21 | 35 | 27 |
| Current consumption (end) | [mA] | 25 | 19 | 19 | 29.5 | 22 |
| Appearance of film (surface decomposition) | | 0 | 0 | 0 | 0 | Slight |
| Infiltration in artificially damaged area | | 0–1 | 0–1 | 0–1 | 0 | 1 |
| Impact resistance [J/mm] | [J/mm] | 12 | 15 | 12 | 13 | 17 |
| Shore D hardness | | 69 | 68 | 65 | 65 | 65 |
| Elongation at break (%) | | 15 | 17 | 17 | 17 | 20 |
| Pot life (min) | | 15 | 15 | 14 | 15 | 17 |
| Workability (min) | | 45 | 45 | 45 | 45 | 55 |

TABLE III

Examples 1–4 (according to the invention) according to 0 value of Example 2, Table I

|  |  | Ex. 1 (Parts) | Ex. 2 (Parts) | Ex. 3 (Parts) | Ex. 4 (Parts) |
|---|---|---|---|---|---|
| Comp. 1 | | | | | |
| Desmophen ® LS 2358 | (Bayer) | 7.65 | 9.56 | 8.65 | 7.65 |
| Desmophen ® VP LS 2285 | (Bayer) | 7.65 | 9.56 | 8.65 | 7.65 |
| Hordaflex SP | (Hoechst) | 11.1 | — | 4.1 | 11.1 |
| Desavin ® | (Bayer) | — | 5.38 | 4.1 | — |
| Desmodur ® VL | (Bayer) | 16.50 | 20.6 | 18.7 | 16.50 |
| Desmodur ® E 14 | (Bayer) | — | — | — | — |
| CD Test (30° C.) ASTMG 42–85 | | | | | |
| Layer thickness (µm) | | 880 | 820 | 890 | 650 |
| Duration (d) | | 28 | 28 | 28 | 28 |
| Current consumption start | [mA] | 15 | 19 | 13 | 19 |
| Current consumption end | [mA] | 22 | 27 | 14 | 24 |
| Appearance of film, surface decomposition | | None | None | None | None |
| Infiltration in artificially damaged area [mm] | | 1 | 1–2 | 1 | 2–3 |

TABLE III-continued

Examples 1–4 (according to the invention) according to 0 value of Example 2, Table I

|  |  | Ex. 1 (Parts) | Ex. 2 (Parts) | Ex. 3 (Parts) | Ex. 4 (Parts) |
|---|---|---|---|---|---|
| Impact resistance | [J/mm] | 11 | 14 | 15 | 15 |
| Shore D hardness |  | 69 | 70 | 69 | 68 |
| Elongation at break (%) |  | 14 | 17 | 15 | 14 |
| Pot life (min) |  | 15 | 14 | 13 | 13 |
| Surfacing resins (min) |  | 45 | 45 | 45 | 45 |

TABLE IV

Examples 1–4 (according to the invention) according to 0 value of Example 3, Table I

|  |  | Ex. 1 (Parts) | Ex. 2 (Parts) | Ex. 3 (Parts) | Ex. 4 (Parts) |
|---|---|---|---|---|---|
| Comp. 1 |  |  |  |  |  |
| Desmophen ® LS 2358 | (Bayer) | 44.30 | 55.38 | 44.30 | 50.2 |
| Butanediol 1.4 | (Bayer) | 8.64 | 10.80 | 8.64 | 9.8 |
| Hordaflex SP ® | (Hoechst) | 35.30 | — | — | — |
| Desavin ® | (Bayer) | — | 22.06 | — | 14.12 |
| Polyacrylonitrile | (Bayer) | — | — | 35.30 | 14.12 |
| Comp. 2 |  |  |  |  |  |
| Desmodur ® VL | (Bayer) | 76.92 | 96.15 | 76.92 | 87.2 |
| CD Test (30° C.) ASTMG 42–85 |  |  |  |  |  |
| Layer thickness ($\mu$m) |  | 880 | 790 | 770 | 820 |
| Duration (d) |  | 28 | 28 | 28 | 28 |
| Current consumption start | [mA] | 23 | 21 | 25 | 25 |
| Current consumption end | [mA] | 28 | 28 | 31 | 30 |
| Appearance of film, surface decomposition |  | None | None | None | None |
| Infiltration in artificially damaged area [mm] |  | 0–1 | 1 | 1 | 0–1 |
| Impact resistance [J/mm] |  | 11 | 16 | 14 | 14 |
| Shore D hardness |  | 72 | 70 | 71 | 71 |
| Elongation at break (%) |  | 12 | 14 | 13 | 15 |
| Pot life | (min) | 15 | 15 | 14 | 12 |
| Workability (min) | (min) | 45 | 45 | 45 | 45 |

TABLE V

Examples 1–4 (according to the invention) according to 0 value of Example 4, Table I

|  |  | Ex. 1 (Parts) | Ex. 2 (Parts) | Ex. 3 (Parts) | Ex. 4 (Parts) |
|---|---|---|---|---|---|
| Comp. 1 |  |  |  |  |  |
| Desmophen ® LS 2358 | (Bayer) | 27.25 | 34.05 | 30.9 | 27.25 |
| Desmophen ® LS 2285 | (Bayer) | 27.25 | 34.05 | 30.9 | 27.25 |
| Butanediol 1.4 | (Bayer) | 4.15 | 5.19 | 4.7 | 4.15 |
| Hordaflex SP ® | (Hoechst) | 39.1 | — | 15.6 | — |
| Polyacrylonitrile | (Bayer) | — | — | — | 39.1 |
| Comp. 2 |  |  |  |  |  |
| Desmodur ® VL | (Bayer) | 76.9 | 96.15 | 87.2 | 76.9 |
| CD Test (30° C.) ASTMG 42–85 |  |  |  |  |  |
| Layer thickness ($\mu$m) |  | 830 | 800 | 700 | 810 |
| Duration (d) |  | 28 | 28 | 28 | 28 |
| Current consumption start | [mA] | 14.5 | 16 | 21 | 22 |
| Current consumption end | [mA] | 19 | 15 | 20 | 25 |
| Appearance of film, surface decomposition |  | None | None | None | None |
| Infiltration in artificially damaged area [mm] |  | 0–1 | 1–2 | 2 | 2 |
| Shore D hardness |  | 71 | 70 | 70 | 72 |
| Elongation at break (%) |  | 14 | 18 | 13 | 15 |
| Pot life (min) |  | 15 | 15 | 14 | 12 |
| Workability (min) |  | 45 | 45 | 45 | 45 |

TABLE VI

Examples 1–4 (according to the invention) according to 0 value of Example 5, Table I

|  |  | Ex. 1 (Parts) | Ex. 2 (Parts) | Ex. 3 (Parts) | Ex. 4 (Parts) |
|---|---|---|---|---|---|
| Comp. 1 |  |  |  |  |  |
| Desmophen ® LS 2358 | (Bayer) | 13.6 | 15.4 | 15.4 | 13.6 |
| Hordaflex SP ® | (Hoechst) | 4.55 | 3.6 | — | — |
| Desavin ® | (Bayer) | — | 3.6 | 3.6 | — |
| Polyacrylonitrile | (Bayer) | 4.55 | — | 3.6 | 9.1 |
| Comp. 2 |  |  |  |  |  |
| Desmodur ® VL | (Bayer) | 18.5 | 21.4 | 21.4 | 18.9 |
| Desmodur ® E 14 | (Bayer) | 3.0 | 3.4 | 3.4 | 3.0 |
| CD Test (30° C.) ASTMG 42–85 |  |  |  |  |  |
| Layer thickness ($\mu$m) |  | 830 | 770 | 800 | 790 |
| Duration (d) |  | 28 | 28 | 28 | 28 |
| Current consumption start | [mA] | 17 | 24 | 13 | 20 |
| Current consumption end | [mA] | 20 | 21 | 29 | 24 |
| Appearance of film, surface decomposition |  | None | None | None | None |

TABLE VI-continued

Examples 1–4 (according to the invention)
according to 0 value of Example 5, Table I

|  | Ex. 1 (Parts) | Ex. 2 (Parts) | Ex. 3 (Parts) | Ex. 4 (Parts) |
|---|---|---|---|---|
| Infiltration in artificially damaged area [mm] | 0 | 1–2 | 0 | 1 |
| Shore D hardness | 16 | 17 | 17 | 15 |
| Elongation at break (%) | 65 | 63 | 63 | 66 |
| Pot life (min) | 17 | 19 | 19 | 17 |
| Workability (min) | 15 | 12 | 12 | 14 |

TABLE VII

Examples 1–5 (according to the invention)
according to 0 value of Example 2, Table I

|  |  | Ex. 1 (Parts) | Ex. 2 (Parts) | Ex. 3 (Parts) | Ex. 4 (Parts) | Ex. 5 Parts) |
|---|---|---|---|---|---|---|
| Comp. 1 |  |  |  |  |  |  |
| Desmophen ® LS 2358 | (Bayer) | 7.65 | 7.65 | 7.65 | 7.65 | 7.65 |
| Desmophen ® LS 2285 | (Bayer) | 7.65 | 7.65 | 7.65 | 7.65 | 7.65 |
| Cerachlor 70/42 ® | (Akzo-ICL) | 11.1 | — | — | 11.1 | — |
| Rishichlor ® | (Rishiroop) | — | 11.1 | — | — | — |
| Polychlrodibutyl-oxybenzene | (Rishiroop) | — | — | 11.1 | — | 11.1 |
| Comp. 2 |  |  |  |  |  |  |
| Desmodur ® VL | (Bayer) | 16.5 | 16.5 | 16.5 | — | — |
| Desmodur ® N 3600 | (Bayer) | — | — | — | 22.6 | 22.6 |
| CD Test (30° C.) ASTMG 42–85 |  |  |  |  |  |  |
| Layer thickness (μm) |  | 780 | 730 | 740 | 800 | 710 |
| Duration (d) |  | 28 | 28 | 28 | 28 | 28 |
| Current consumption (start) | [mA] | 24 | 20 | 35 | 21 | 24 |
| Current consumption (end) | [mA] | 31 | 23 | 27 | 30 | 38 |
| Appearance of film (surface decomposition) |  | None | None | None | Slight | Slight |
| Infiltration in artificially damaged area |  |  |  |  |  |  |
| Damage [mm] |  | 0 | 0 | 0–1 | 2–3 | 2–3 |
| Impact resistance [J/mm] |  | 11 | 11 | 12 | 15 | 16 |
| Shore D hardness |  | 69 | 69 | 68 | 64 | 64 |
| Elongation at break (%) |  | 14 | 13 | 14 | 17 | 18 |
| Pot life (min) |  | 15 | 15 | 14 | 19 | 19 |
| Surfacing resins (min) |  | 45 | 45 | 45 | 55 | 55 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solvent-free, two-component polyurethane coating composition that is suitable for the production of coatings that have long term resistance to temperatures of up to 30° C., have good elongation and withstand cathodic protection, which comprises A) a solvent-free polymer mixture comprising
 I) 5 to 50 wt. % of a component free from OH groups and comprising
  a) 0 to 100 wt. % of a chlorinated paraffin or dibutoxybenzene,
  b) 0 to 100 wt. % of a di-[phenoxy-alkyl]formal,
  c) 0 to 100 wt. % of a polyacrylonitrile, wherein the percentages of I-a), I-b) and I-c) add up to 100 wt. %, based on the weights of I-a) to I-c), and II) 50 to 95 wt. % of a component having hydroxyl groups comprising
- a) 40 to 100 wt. % of a component which contains hydroxy groups and ether groups, has a functionality of $\geq 3.5$ and a number average molecular weight of 280 to 1000, and is different from b),
- b) 0 to 60 wt. % of a hydroxy-functional polyether polyacrylate and
- c) 0 to 60 wt. % of a hydroxy-functional compound other than a) and b), wherein the wt. % of 11-a) to 11-c) add up to 100 wt. %, based on the weight of component 11) and B) a polyisocyanate component comprising at least one organic polyisocyanate, wherein the NCO:OH equivalent ratio is 0.8:1 to 1.5:1.

2. The coating composition of claim 1 wherein Component I comprises
- d) a mixture of a) and b) wherein the weight ratio of a):b) is 99:1 to 1:99,
- e) a mixture of a) and c) wherein the weight ratio of a):c) is 99:1 to 1:99 or
- f) a mixture of b) and c) wherein the weight ratio of b):c) is 99:1 to 1:99.

3. The coating composition of claim 1 wherein the NCO/OH equivalent ratio is 0.9:1 to 1.3:1.

4. The coating composition of claim 1 wherein component 1) comprises a chlorinated paraffin.

5. The coating composition of claim 1 component 1) comprises polychlorodibutoxybenzene.

6. The coating composition of claim 1 wherein component 1) comprises polyacrylonitrile having a number average molecular weight of 1000 to 3500.

7. The coating composition of claim 1 wherein component 1) comprises di-(phenoxyethyl)formal.

8. The coating composition of claim 1 wherein component II-a) has a number average molecular weight of 350 to 700.

9. The coating composition of claim 1 wherein component II-a) has a functionality of >4.

10. The coating composition of claim 1 wherein component II-c) is present and has a number average molecular weight of 32 to 350.

11. The coating composition of claim 1 wherein component B) comprises an aromatic, organic polyisocyanate.

12. The coating composition of claim 1 wherein component B) comprises an aliphatic organic polyisocyanate.

13. An optionally cathodically protected, metallic substrate coated with the coating composition of claim 1.

14. The optionally cathodically protected, metallic substrate of claim 13 wherein the metallic substrate is a sheet piling, lock, pipe or ship.

* * * * *

UNITED STATES PATENT AND TRADEMARK OFFICE
CERTIFICATE OF CORRECTION

PATENT NO. : 6,723,787 B2
DATED : April 20, 2004
INVENTOR(S) : Jurgen Schwindt, Malte Homann and Karl-Heinz Kolping It is certified that error appears in the above-identified patent and that said Letters Patent is hereby corrected as shown below:

Column 15,
Line 13, delete "11-a) to 11-c)" and insert -- II-a) to II-c) --.
Line 14, delete "11)" and insert -- II) --.

Column 16,
Lines 2, 3, 6 and 9, delete "1)" and insert -- I) --.

Signed and Sealed this

Seventh Day of December, 2004

JON W. DUDAS
*Director of the United States Patent and Trademark Office*